United States Patent
Kitagawa et al.

(10) Patent No.: US 12,278,381 B2
(45) Date of Patent: Apr. 15, 2025

(54) LAMINATE BATTERY

(71) Applicant: SHARP KABUSHIKI KAISHA, Sakai (JP)

(72) Inventors: Tomo Kitagawa, Sakai (JP); Hirotaka Mizuhata, Sakai (JP); Shunsuke Sata, Sakai (JP); Akihito Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 375 days.

(21) Appl. No.: 17/771,252

(22) PCT Filed: Sep. 16, 2020

(86) PCT No.: PCT/JP2020/035092
§ 371 (c)(1),
(2) Date: Apr. 22, 2022

(87) PCT Pub. No.: WO2021/079658
PCT Pub. Date: Apr. 29, 2021

(65) Prior Publication Data
US 2022/0416332 A1 Dec. 29, 2022

(30) Foreign Application Priority Data
Oct. 25, 2019 (JP) .................. 2019-194506

(51) Int. Cl.
*H01M 50/463* (2021.01)
*H01M 4/24* (2006.01)
(Continued)

(52) U.S. Cl.
CPC ......... *H01M 50/102* (2021.01); *H01M 12/06* (2013.01); *H01M 50/463* (2021.01)

(58) Field of Classification Search
CPC .. H01M 50/102; H01M 12/06; H01M 50/463; H01M 4/24; H01M 10/02;
(Continued)

(56) References Cited

U.S. PATENT DOCUMENTS

2004/0224195 A1* 11/2004 Huang ................. H01M 12/06
429/406
2010/0304274 A1* 12/2010 Bennett .............. H01M 4/8605
429/499
(Continued)

FOREIGN PATENT DOCUMENTS

| JP | 2001-319683 A | | 11/2001 |
| JP | 2013-020769 | * | 1/2013 |

(Continued)

*Primary Examiner* — Lisa S Park
(74) *Attorney, Agent, or Firm* — ScienBiziP, P.C.

(57) ABSTRACT

Provided is a laminate battery in which a short circuit between a negative electrode active material and a positive electrode due to expansion of the negative electrode active material during discharging is prevented.

A laminate battery includes a battery case that serves as an outer case. The laminate battery includes an inner case within a battery case 11, and the inner case is formed of a positive electrode storage case and a separator. An inside of the inner case serves as a positive electrode storage portion that stores a positive electrode. An outside of the inner case serves as a negative electrode storage portion that stores a negative electrode. The negative electrode uses a particulate negative electrode active material (e.g., zinc or zinc oxide).

8 Claims, 10 Drawing Sheets

(51) Int. Cl.
*H01M 12/06* (2006.01)
*H01M 50/102* (2021.01)

(58) Field of Classification Search
CPC .. H01M 50/136; H01M 50/105; H01M 10/04; H01M 12/08; H01M 50/121; H01M 50/1385; H01M 50/489; H01M 10/28; H01M 50/10; H01M 4/06; Y02E 60/10; Y02P 70/50
See application file for complete search history.

(56) References Cited

U.S. PATENT DOCUMENTS

2012/0009491 A1* 1/2012 Friesen ................. H01M 12/06
429/418
2014/0093791 A1* 4/2014 Suzuki ................... H01M 4/96
429/405
2018/0337382 A1* 11/2018 Iida ..................... H01M 50/417

FOREIGN PATENT DOCUMENTS

| JP | WO2013118627 | * | 5/2015 |
| WO | WO2013047778 | * | 4/2013 |
| WO | 2013/118627 A1 | | 8/2013 |

* cited by examiner

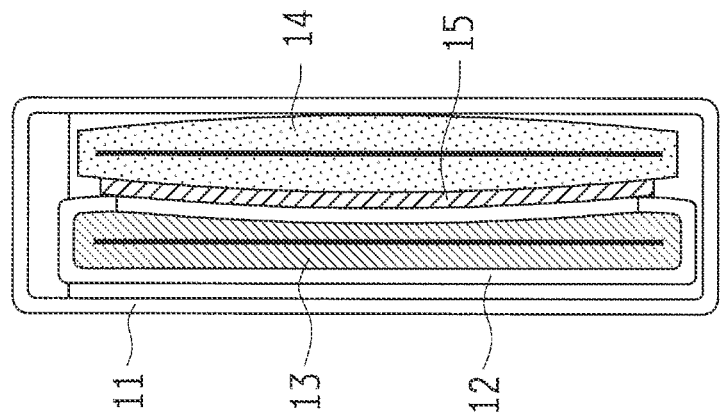
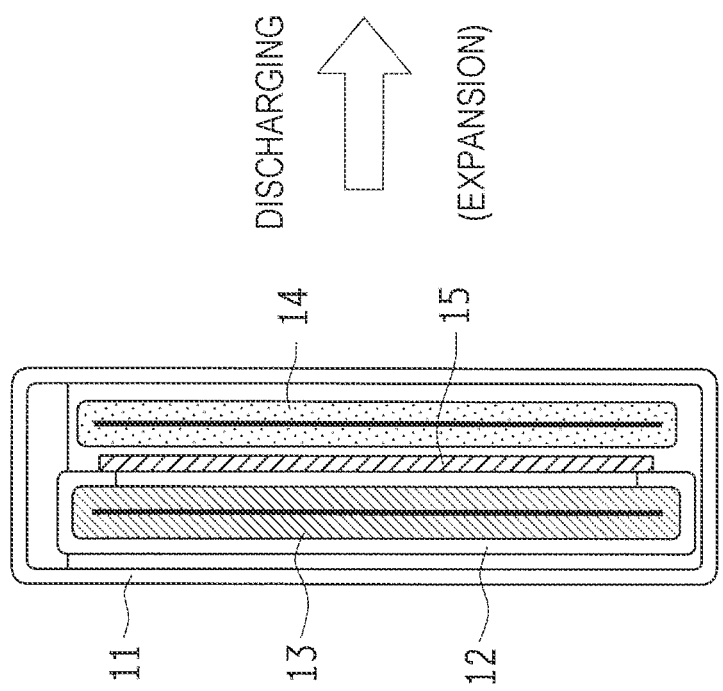
FIG. 2

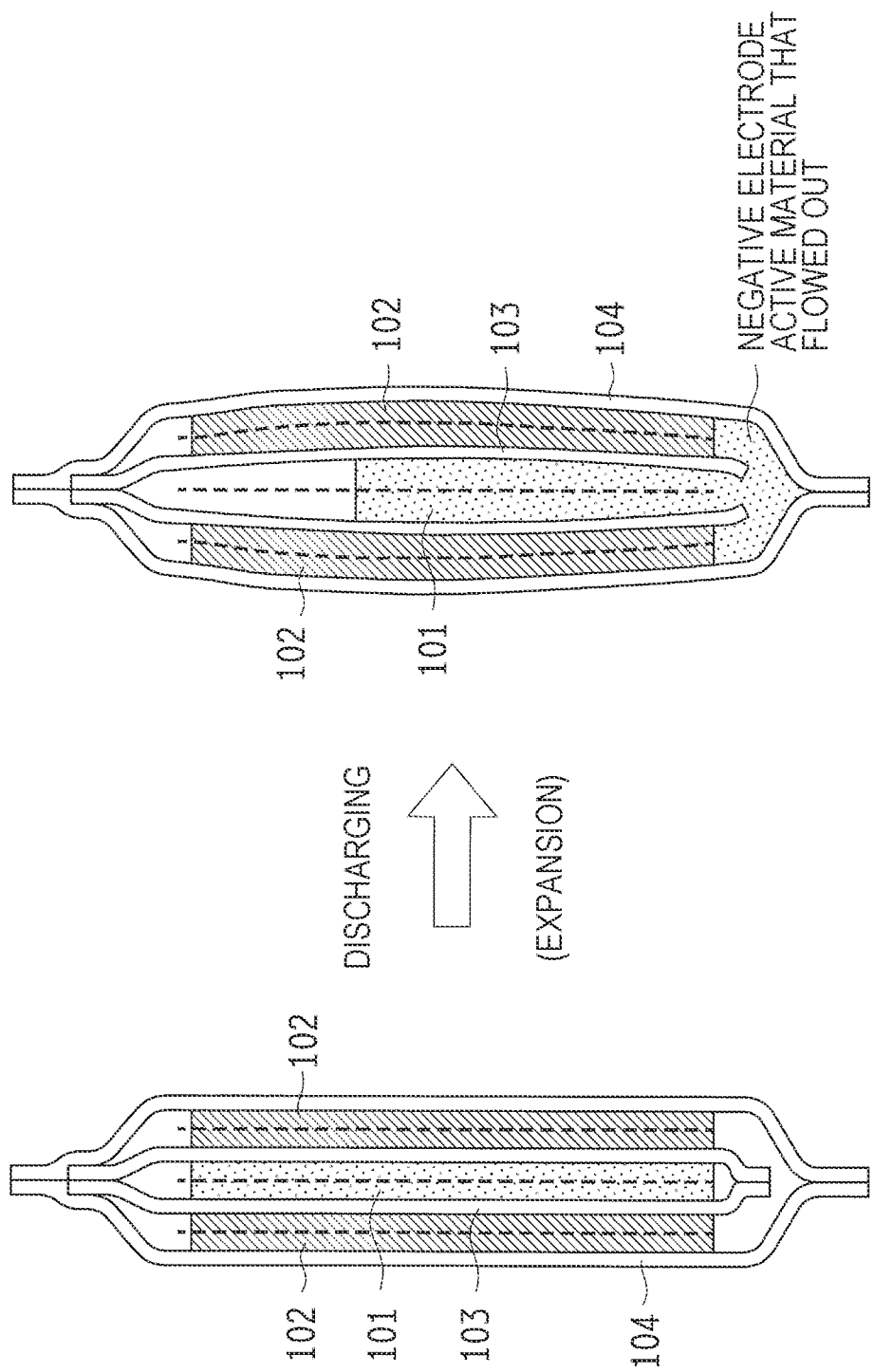

LAMINATE BATTERY

This application claims priority based on Japanese Patent Application No. 2019-194506 filed on Oct. 25, 2019, the contents of which are incorporated herein by reference.

TECHNICAL FIELD

The present disclosure relates to a laminate battery including a positive electrode, a negative electrode, and a separator that are laminated in place within an enclosure member.

BACKGROUND ART

In recent years, laminate batteries having a configuration in which a positive electrode, a negative electrode, and a separator are laminated in place within an enclosure member (a configuration in which a separator is disposed between a negative electrode and a positive electrode) have been put into practical use. These laminate batteries include batteries that use a bag-shaped separator as a storage portion for a negative electrode active material or a positive electrode active material. For example. Patent Literature 1 discloses a rectangular alkaline storage battery in which a positive electrode, which has a current collecting terminal connection tab at a lateral side, and a negative electrode are laminated, with at least one of the positive electrode and the negative electrode being wrapped in a bag-shaped separator.

CITATION LIST

Patent Literature

PTL 1: Japanese Unexamined Patent Application Publication No. 2001-319683

SUMMARY OF INVENTION

Technical Problem

In instances where a bag-shaped separator is used as a negative electrode storage portion in a laminate battery that uses a metal such as zinc as a negative electrode active material, in some cases, a current collector and a particulate negative electrode active material (e.g., zinc powder) are enclosed in the bag-shaped separator. For example, in a laminate battery illustrated in FIG. 10, a negative electrode 101 is stored in a bag-shaped separator 103, which is made of two separators bonded together by welding. The negative electrode 101 is formed of a current collector and a negative electrode active material (e.g., zinc powder). The bag-shaped separator 103 is stored in an enclosure member 104, which is made of two plastic films bonded together by welding. Within the enclosure member 104, a portion outside of the bag-shaped separator 103 serves as a positive electrode storage portion. That is, a positive electrode 102 is disposed between the separator and a plastic film on both sides of the bag-shaped separator 103.

In instances where a metal such as zinc is used as a negative electrode active material, a change in volume (expansion) of the negative electrode active material occurs in the process in which the metal is oxidized to an oxide during the discharge reaction. In the laminate battery illustrated in FIG. 10, if the negative electrode active material of the negative electrode 101 expands, internal pressure is exerted on the bag-shaped separator 103, which has a limited volume, and, consequently, a seal portion (welded portion) of the bag-shaped separator 103 may break. If the seal of the bag-shaped separator 103 breaks, the negative electrode active material may flow out to the positive electrode storage portion, which may cause a short circuit with the positive electrode 102.

The present disclosure has been made in view of the above problem, and an object of the present disclosure is to provide a laminate battery in which a short circuit between a negative electrode active material and a positive electrode due to expansion of the negative electrode active material during discharging is prevented.

Solution to Problem

To solve the problem described above, a laminate battery according to a first aspect of the present disclosure is provided. The laminate battery includes a positive electrode, a negative electrode, and a separator that are laminated in place within an enclosure member. The laminate battery includes an outer case and an inner case. The outer case serves as the enclosure member, and the inner case is disposed within the outer case and includes the separator. An inside of the inner case serves as a positive electrode storage portion that stores the positive electrode, and an outside of the inner case serves as a negative electrode storage portion that stores the negative electrode. The negative electrode includes a particulate negative electrode active material.

In the configuration described above, the inside of the inner case, which has a smaller volume than the outer case, serves as a positive electrode storage portion; consequently, even if the negative electrode active material expands as a result of discharging, internal pressure does not increase in the positive electrode storage portion, and, therefore, breakage does not occur in the positive electrode storage portion. As long as the inner case that serves as the positive electrode storage portion does not break, the negative electrode active material does not flow out to the positive electrode storage portion from the negative electrode storage portion, and, therefore, the occurrence of a short circuit between the positive electrode and the negative electrode active material is prevented.

Furthermore, to solve the problem described above, a laminate battery according to a second aspect of the present disclosure is provided. The laminate battery includes a positive electrode, a negative electrode, and a separator that are laminated in place within an enclosure member. The enclosure member is formed of a first plastic film and a second plastic film that are bonded together. The separator is disposed between the first plastic film and the second plastic film, and a peripheral portion of the separator is welding to the first plastic film. A space between the separator and the first plastic film serves as a positive electrode storage portion that stores the positive electrode, and an outer periphery of the positive electrode storage portion is formed by a welded portion of the separator and the first plastic film. A space between the separator and the second plastic film serves as a negative electrode storage portion that stores the negative electrode, and an outer periphery of the negative electrode storage portion is formed by a welded portion of the first plastic film and the second plastic film. The negative electrode includes a particulate negative electrode active material.

In the configuration described above, the positive electrode storage portion, in which the outer periphery is formed by the welded portion of the separator and the first plastic film, has a smaller volume than the negative electrode storage portion, in which the outer periphery is formed by the welded portion of the first plastic film and the second plastic film; consequently, even if the negative electrode active material expands as a result of discharging, internal pressure does not increase in the positive electrode storage portion, and, therefore, breakage does not occur in the positive electrode storage portion. As long as the positive electrode storage portion does not break, the negative electrode active material does not flow out to the positive electrode storage portion from the negative electrode storage portion, and, therefore, the occurrence of a short circuit between the positive electrode and the negative electrode active material is prevented.

Furthermore, to solve the problem described above, a laminate battery according to a third aspect of the present disclosure is provided. The laminate battery includes a positive electrode, a negative electrode, and a separator that are laminated in place within an enclosure member. The enclosure member is formed of a first plastic film and a second plastic film that are bonded together, the positive electrode includes a first positive electrode and a second positive electrode, the first positive electrode is disposed to face the first plastic film, and the second positive electrode is disposed to face the second plastic film. The separator includes a first separator and a second separator that are disposed between the first plastic film and the second plastic film, a peripheral portion of the first separator is welding to the first plastic film, and a peripheral portion of the second separator is welding to the second plastic film. A space between the first separator and the first plastic film serves as a positive electrode storage portion that stores the first positive electrode, and an outer periphery of the positive electrode storage portion is formed by a welded portion of the first separator and the first plastic film. A space between the second separator and the second plastic film serves as a positive electrode storage portion that stores the second positive electrode, and an outer periphery of the positive electrode storage portion is formed by a welded portion of the second separator and the second plastic film. A space between the first separator and the second separator serves as a negative electrode storage portion that stores the negative electrode, and an outer periphery of the negative electrode storage portion is formed by a welded portion of the first plastic film and the second plastic film. The negative electrode includes a particulate negative electrode active material.

In the configuration described above, the positive electrode storage portion, in which the outer periphery is formed by the welded portion of the first separator and the first plastic film or by the welded portion of the second separator and the second plastic film, has a smaller volume than the negative electrode storage portion, in which the outer periphery is formed by the welded portion of the first plastic film and the second plastic film; consequently, even if the negative electrode active material expands as a result of discharging, internal pressure does not increase in the positive electrode storage portion, and, therefore, breakage does not occur in the positive electrode storage portion. As long as the positive electrode storage portion does not break, the negative electrode active material does not flow out to the positive electrode storage portion from the negative electrode storage portion, and, therefore, the occurrence of a short circuit between the positive electrode and the negative electrode active material is prevented.

Advantageous Effects of Invention

Effects of laminate batteries of the present disclosure include the following effect: in instances where a negative electrode active material expands as a result of discharging, the occurrence of breakage of a positive electrode storage portion is prevented, which in turn prevents the occurrence of a short circuit between a positive electrode and the negative electrode active material.

BRIEF DESCRIPTION OF DRAWINGS

FIG. 1(a) is a plan view of the laminate battery, and FIG. 1(b) is a cross-sectional view taken along line A-A of FIG. 1(a).

FIG. 2 is a cross-sectional view illustrating a change in a shape of the laminate battery of FIG. 1 due to discharging.

FIG. 3(a) is a plan view of the laminate battery, and FIG. 3(b) is a cross-sectional view taken along line A-A of FIG. 3(a).

FIG. 4(a) is a plan view of the laminate battery, and FIG. 4(b) is a cross-sectional view taken along line A-A of FIG. 4(a).

FIG. 7(a) is a plan view of the laminate battery, and FIG. 7(b) is a cross-sectional view taken along line A-A of FIG. 7(a).

FIG. 10 is a cross-sectional view illustrating a change in a shape of a laminate battery of the related art due to discharging.

DESCRIPTION OF EMBODIMENTS

First Embodiment

Embodiments of the present disclosure will now be described in detail with reference to the drawings.

Figure 1:
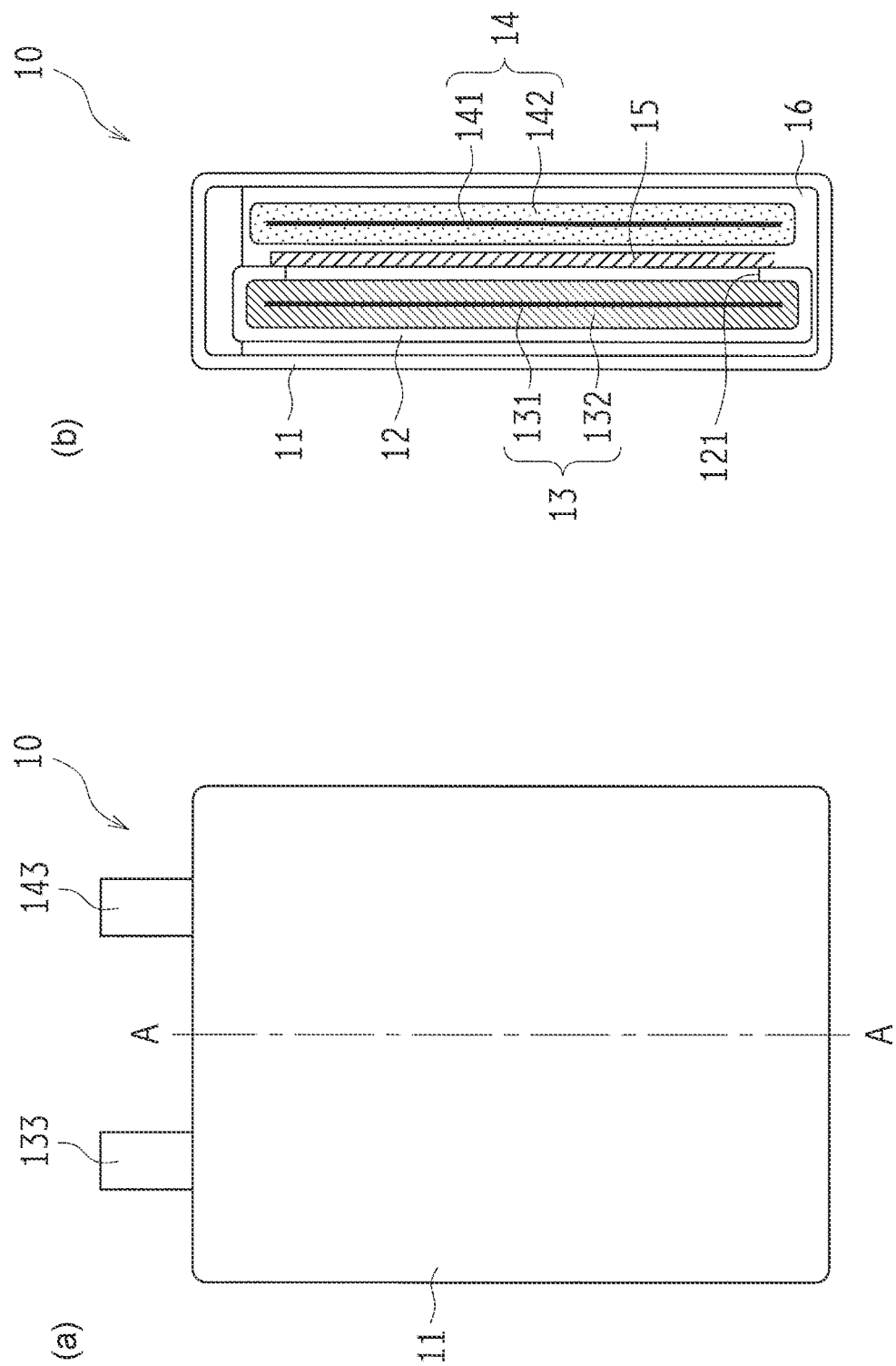
FIG. 1 is a diagram illustrating a general configuration of a laminate battery according to a first embodiment.

FIG. 1 is a diagram illustrating a general configuration of a laminate battery 10, according to a first embodiment. FIG. 1(a) is a plan view of the laminate battery 10, and FIG. 1(b) is a cross-sectional view taken along line A-A of FIG. 1(a).

As illustrated in FIG. 1, the laminate battery 10 includes a battery case 11, which serves as an enclosure member and is made of plastic, and the laminate battery 10 includes a positive electrode storage case 12, a positive electrode 13, a negative electrode 14, and a separator 15 within the battery case 11. Furthermore, an electrolyte solution 16 is loaded within the battery case 11. Note that for the sake of convenience, the following description is provided assuming that the upper side of FIG. 1 is the upper side of the laminate battery 10.

The positive electrode storage case 12 is a case having an opening 121 and made of plastic (preferably made of an insulative plastic film) and in which the positive electrode 13 is stored. The positive electrode 13 has a form in which a positive electrode active material 132 is laminated on a current collector 131. The opening 121 is formed on a side that faces the negative electrode 14 in the positive electrode storage case 12. A portion of the current collector 131 is extended outside of the positive electrode storage case 12 and the battery case 11, and the portion serves as a lead portion 133 of the laminate battery 10. Note that the lead portion 133 may not necessarily be a portion of the current collector 131, and it is sufficient that the current collector 131 and a lead portion 133 exposed outside of the battery case be electrically connected to each other.

The negative electrode 14 is formed of a current collector 141 and a negative electrode active material 142. Note that while the negative electrode active material 142 is illustrated as being formed in the form of a layer around the current collector 141 in FIG. 1, the negative electrode active material 142 is actually a metal powder, such as a zinc powder. That is, the negative electrode active material 142 is loaded together with the electrolyte solution 16 within a negative electrode storage portion. A portion of the current collector 141 is extended outside of the battery case 11, and the portion serves as a lead portion 143 of the laminate battery 10. Note that the lead portion 143 may not necessarily be a portion of the current collector 141, and it is sufficient that the current collector 141 and a lead portion 143 exposed outside of the battery case be electrically connected to each other.

The separator 15 is bonded (e.g., by welding) to an outer surface of the positive electrode storage case 12 and covers the opening 121 of the positive electrode storage case 12. The separator 15 prevents a short circuit between the positive electrode 13 and the negative electrode 14 while allowing the passage of the electrolyte solution 16 therethrough.

In the laminate battery 10, an interior space surrounded by the positive electrode storage case 12 and the separator 15 serves as a positive electrode storage portion. Further, a space outside of the positive electrode storage portion in an interior space of the battery case 11 serves as the negative electrode storage portion.

The electrolyte solution 16 is an electrolyte disposed at least between the positive electrode 13 and the negative electrode 14 to enable the transfer of electrical charges between the positive electrode 13 and the negative electrode 14.

In the laminate battery 10 of the first embodiment, a material and the like of each of the components are not particularly limited and may be those conventionally used in the field of laminate batteries. For example, the separator 15 may be a porous polyolefin film. Furthermore, the separator 15 may be an ion exchange membrane. Furthermore, the negative electrode active material used in the negative electrode may be, for example, zinc particles, and in instances where the laminate battery 10 is a secondary battery, the negative electrode active material may be a material containing zinc oxide particles. The positive electrode active material used in the positive electrode may be, for example, nickel oxyhydroxide.

In the laminate battery 10, during discharging, the negative electrode active material 142 used in the negative electrode 14 undergoes a change in volume (expansion), which causes a change in a shape of the laminate battery 10. FIG. 2 is a cross-sectional view illustrating a change in the shape of the laminate battery 10 due to discharging.

As illustrated in FIG. 2, in instances where the negative electrode active material 142 expands as a result of discharging, the expansion causes the positive electrode storage case 12, which forms the positive electrode storage portion, and the separator 15 to also deform. Note that the deformation that occurs in the positive electrode storage portion is forcibly caused in response to the expansion of the negative electrode active material 142, which is externally located, that is, the deformation is not due to expansion within the positive electrode storage portion. Accordingly, internal pressure is not exerted in the positive electrode storage portion, and, therefore, breakage does not occur in a welded portion and the like of the positive electrode storage portion.

Note that in the laminate battery 10, the negative electrode storage portion, that is, the battery case 11, has a larger volume than the positive electrode storage portion and also includes some space in an upper portion, and, therefore, even if the negative electrode active material 142 expands, the negative electrode storage portion can be easily deformed in a manner that inhibits an increase in the internal pressure. Accordingly, breakage of the battery case 11 due to expansion of the negative electrode active material 142 does not occur.

As described above, the laminate battery 10 of the first embodiment has a configuration with a dual structure including an outer case (the battery case 11) and an inner case (the positive electrode storage case 12 and the separator 15), with the positive electrode 13 being stored in the inner case. Accordingly, even if the negative electrode active material 142 expands in the negative electrode 14, which is stored outside of the inner case, breakage of the inner case due to the expansion is prevented. As long as the inner case does not break, the negative electrode active material 142 does not flow out from the negative electrode storage portion, and, consequently, the occurrence of a short circuit between the positive electrode 13 and the negative electrode active material 142 is prevented. Note that in instances where the laminate battery 10 is a secondary battery, the repeating of the charge-discharge cycle causes a significant expansion of the negative electrode active material 142, and, therefore, application of the present disclosure is suitable.

Figure 3:
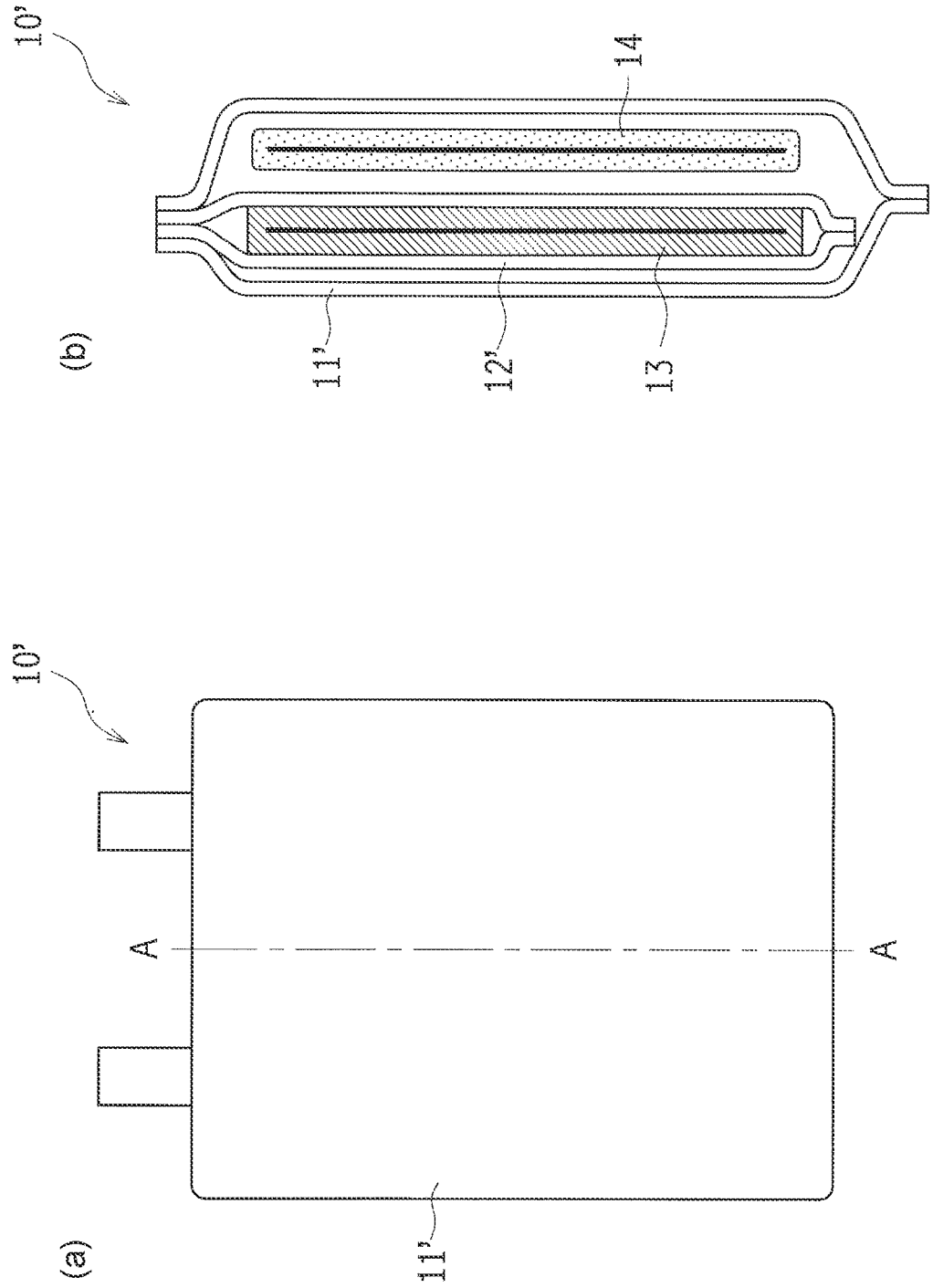
FIG. 3 is a diagram illustrating a general configuration of another laminate battery according to the first embodiment.

In the laminate battery 10 illustrated in FIG. 1, the battery case 11 and the positive electrode storage case 12 are cases made of plastic. Another possible configuration is one in which a battery case 11' and a positive electrode storage case 12', which are made of two of plastic films and a separator that are bonded together to have a bag shape, are used, as in a laminate battery 10', illustrated in FIG. 3. Specifically, in the laminate battery 10', the battery case 11' is formed of two plastic films bonded together to have a bag shape, and the positive electrode storage case 12' is formed of a plastic film and a separator that are bonded together to have a bag shape. In the positive electrode storage case 12', the separator is disposed on a side that faces the negative electrode 14. In this configuration, the opening 121 need not be provided in the positive electrode storage case 12'.

Second Embodiment

The first embodiment discloses a configuration for instances in which the present disclosure is applied to an ordinary battery. A second embodiment describes a suitable configuration for instances in which the present disclosure is applied to a metal-air battery.

Figure 4:
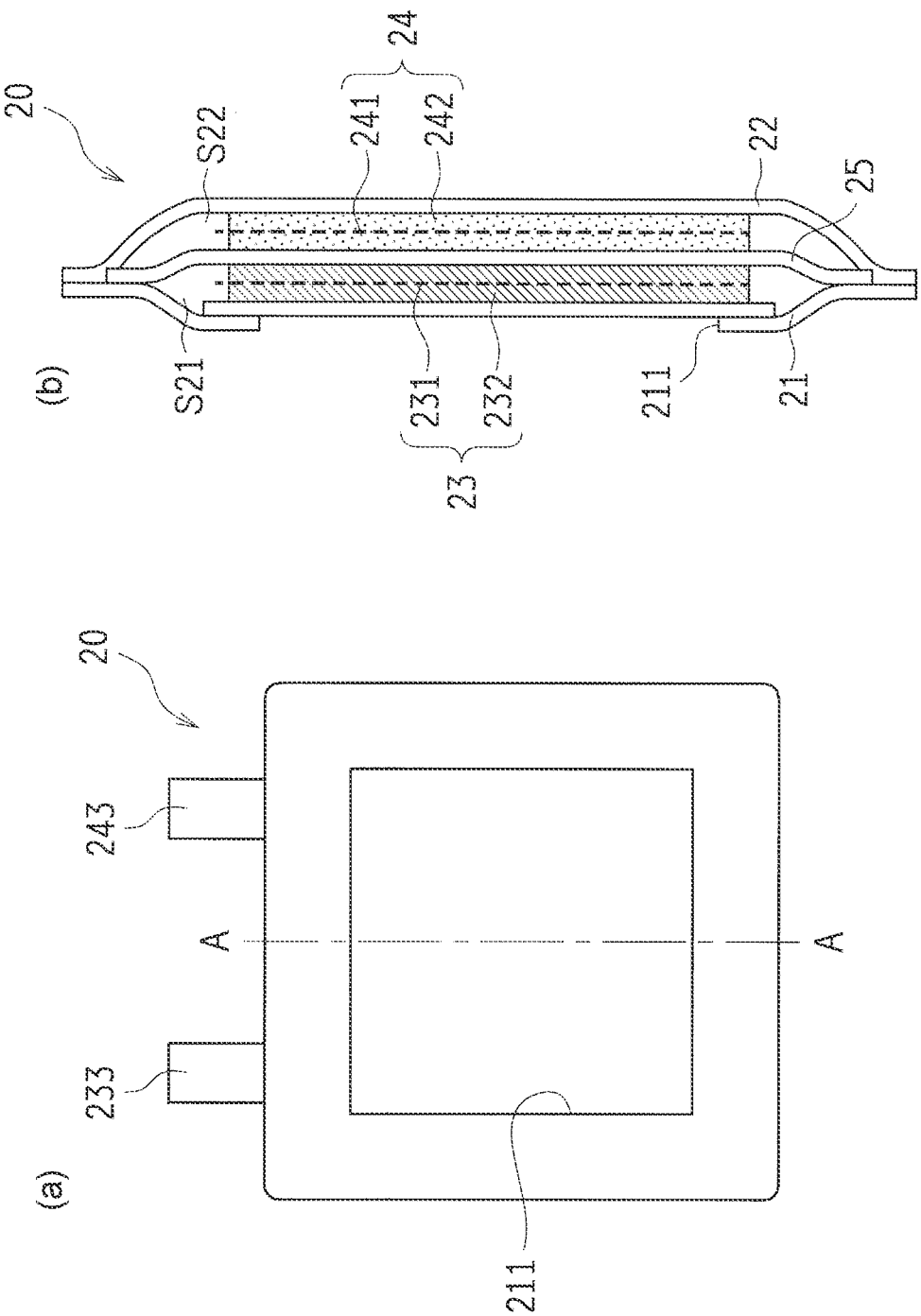
FIG. 4 is a diagram illustrating a general configuration of a laminate battery according to a second embodiment.

FIG. 4 is a diagram illustrating a general configuration of a laminate battery 20, according to the second embodiment. FIG. 4(a) is a plan view of the laminate battery 20, and FIG. 4(b) is a cross-sectional view taken along line A-A of FIG. 4(a).

As illustrated in FIG. 4, the laminate battery 20 has an enclosure member (battery case) formed of a first plastic film 21 and a second plastic film 22 that are bonded together, and the laminate battery 20 includes an air electrode 23, a metal negative electrode 24, a separator 25, and a water-repellent film 26 within the enclosure member. Furthermore, an electrolyte solution (not illustrated) is loaded within the enclosure member.

The first plastic film 21 has an air inlet opening 211, which is an opening for drawing in air. Furthermore, the first plastic film 21 may be a plastic film that is employed in known laminate batteries. More specifically, it is preferable that the first plastic film 21 be formed of a thermoplastic resin that can be welding to the second plastic film 22 and has excellent alkali resistance. For example, the first plastic film 21 may be a polyolefin-based plastic film, and the polyolefin may be polypropylene, polyethylene, and/or the like. Note that for the purpose of reinforcement, the following configuration may be employed: a plastic film layer or a metal film layer is laminated on an outer air side of the first plastic film 21 and the second plastic film 22, the plastic film layer is made of nylon, polyethylene terephthalate, or the like, and the metal film layer is made of aluminum foil, stainless steel foil, or the like. Furthermore, it is preferable that the first plastic film 21 have a thickness of 0.02 mm to 0.25 mm, which is not a particular limitation. If the thickness of the first plastic film 21 is less than 0.02 mm, sufficient fusing may not be achieved during welding, which may result in insufficient bonding strength. On the other hand, if the thickness of the first plastic film 21 is greater than 0.25 mm, the film cannot be easily stretched, and, therefore, when the battery expands, stress may be concentrated at the welded portion, which may cause peeling of the welded portion. Furthermore, it is preferable that an opening ratio of the air inlet opening 211 in the first plastic film 21 be 10% to 70%.

The separator 25 is disposed to face the first plastic film 21, and a peripheral portion of the separator 25 is welding to a peripheral portion of the first plastic film 21. The separator 25 may be made of a separator material commonly used in the field of metal-air batteries provided that the material can be welding to the first plastic film 21. It is preferable that the separator 25 have a thickness of 0.05 mm to 0.4 mm, which is not a particular limitation. If the thickness of the separator 25 is less than 0.05 mm, a volume change of the negative electrode active material may cause failure of the separator 25. On the other hand, if the thickness of the separator 25 is greater than 0.4 mm, an increase in internal resistance may result in a decrease in the power of the battery.

A space between the first plastic film 21 and the separator 25 serves as a first storage portion S21, and the air electrode 23 and the water-repellent film 26 are stored in the first storage portion S21. More specifically, the water-repellent film 26 is welding to the first plastic film 21 and covers the air inlet opening 211. The air electrode 23 is disposed between the water-repellent film 26 and the separator 25. Details of the air electrode 23 and the water-repellent film 26 will be described later.

The second plastic film 22 is disposed opposite to the first plastic film 21 and faces the separator 25. Furthermore, a peripheral portion of the second plastic film 22 may be welding to the separator 25. The second plastic film 22 may appropriately be a plastic film that is used in the first plastic film 21. It is preferable, for the same reason as that of the first plastic film 21, that the second plastic film 22 have a thickness of 0.02 mm to 0.25 mm.

A space between the second plastic film 22 and the separator 25 serves as a second storage portion S22, and the metal negative electrode 24 is stored in the second storage portion S22. Details of the metal negative electrode 24 will be described later. Note that in the second storage portion S22, a peripheral portion of the separator 25 may be welding to a peripheral portion of the second plastic film 22. Note that even in instances where the separator 25 and the second plastic film 22 are welding to each other, it is the welded portion of the first plastic film 21 and the second plastic film 22 that forms the outer periphery of the second storage portion S22.

In the laminate battery 20, an area of the separator 25 is slightly smaller than an area of the first plastic film 21 (including the air inlet opening 211) and an area of the second plastic film 22. Accordingly, the first storage portion S21, which is formed by bonding together the separator 25 and the first plastic film 21, has a smaller volume than the second storage portion S22, which is formed by bonding together the first plastic film 21 and the second plastic film 22. In this configuration, the second storage portion S22, which has a larger volume than the first storage portion S21, includes some extra space therein, and, accordingly, an effect is produced in which even if the metal negative electrode 24 expands, the second storage portion S22 can be easily deformed in a manner that inhibits an increase in pressure within the second storage portion S22. For example, it is preferable that the area of the separator 25 be 25 $cm^2$ to 240 $cm^2$, and it is preferable that the area of the first plastic film 21 and the area of the second plastic film 22 each be 30 $cm^2$ to 250 $cm^2$, where the area of the first plastic film 21 includes an open area of the air inlet opening 211. Furthermore, it is preferable that a ratio of the area of the separator 25 to the area of the first plastic film 21 be 0.55 to 0.95, where the area of the first plastic film 21 includes the open area of the air inlet opening 211. Furthermore, it is preferable that the volume of the first storage portion S21 be 0.05 to 0.25 times the volume of the second storage portion S22.

The water-repellent film 26 is provided to prevent leakage of the electrolyte solution from the air inlet opening 211 and has a gas-liquid separation function. The water-repellent film 26 is secured to the first plastic film 21 by welding or the like and covers the air inlet opening 211. A material of the water-repellent film 26 is not particularly limited provided that the material is one that is commonly used in the field of metal-air batteries and which can be secured to the first plastic film 21. It is preferable that the water-repellent film 26 have a thickness of 0.05 mm to 0.5 mm.

The air electrode 23 is formed of a current collector 231 and a catalyst layer 232, which is in contact with the current collector 231. A portion of the current collector 231 is extended outside of the enclosure member and serves as a lead portion 233 of the laminate battery 20. A material of the current collector 231 is not particularly limited provided that the material is one commonly used in the field of metal-air batteries. Furthermore, it is preferable that the current collector 231 have a thickness of 0.05 mm to 0.5 mm.

The catalyst layer 232 at least includes an air electrode catalyst. The air electrode catalyst is a catalyst at least having a oxygen reduction ability. Examples of the air electrode catalyst include conductive carbon, such as Ketjen black, acetylene black, Denka black, carbon nanotubes, and fullerene; metals, such as platinum; metal oxides, such as manganese oxide; metal hydroxides, and metal sulfides. One or more of these may be used. Accordingly, a triple-phase boundary at which an oxygen gas, water, and electrons coexist can be formed on the air electrode catalyst, to enable the discharge reaction to proceed. In instances where the laminate battery 20 is a primary battery, the catalyst layer 232 may include a catalyst such as manganese dioxide. Furthermore, in instances where the laminate battery 20 is a secondary battery, the catalyst layer 232 may include not only an air electrode catalyst having an oxygen reduction ability but also a catalyst having an oxygen generation ability or include a bi-functional catalyst having both an oxygen generation ability and an oxygen reduction ability.

It is preferable that a mass ratio of the air electrode catalyst present in the catalyst layer 232 be greater than or equal to 5 mass % relative to a mass of the catalyst layer 232. An air electrode catalyst layer may include a binding agent in addition to the air electrode catalyst. A binding agent, such as polytetrafluoroethylene, may be used in the catalyst layer 232. It is preferable that the catalyst layer 232 have a thickness of 0.1 mm or greater and 1.0 mm or less.

The metal negative electrode 24 is formed of a current collector 241 and a negative electrode active material 242. More specifically, the metal negative electrode 24 is formed by separately loading the current collector 241 and the negative electrode active material 242 (e.g., zinc or zinc oxide), which is a particulate material, into the second storage portion S22 of the laminate battery 20. A portion of the current collector 241 is extended outside of the enclosure member and serves as a lead portion 243 of the laminate battery 20. It is preferable that the current collector 241 have a thickness of 0.05 mm to 0.50 mm. Furthermore, a resin additive or the like for improving binding properties and/or rheological properties of the negative electrode active material 242 may be appropriately included.

The negative electrode active material 242 may be appropriately selected from materials commonly used in the field of metal-air batteries. Examples of the negative electrode active material 242 include metal species, such as cadmium species, lithium species, sodium species, magnesium species, lead species, zinc species, tin species, aluminum species, and iron species. The negative electrode active material 242 is reduced when charging takes place and, therefore, may be in the form of a metal oxide.

It is preferable that the negative electrode active material 242 have an average particle diameter of 1 nm to 500 μm. The average particle diameter is more preferably 5 nm to 300 μm, even more preferably 100 nm to 250 μm, and particularly preferably 200 nm to 200 μm. The average particle diameter can be measured by using a particle size distribution analyzer.

Furthermore, an electrolyte solution (not illustrated) appropriately selected in accordance with the metal species used in the negative electrode active material 242 is stored in the second storage portion S22. The metal negative electrode 24 may be a slurry in which the negative electrode active material 242 is dispersed in the electrolyte solution. In this instance, it is preferable that a ratio of a weight of the electrolyte solution to a weight of the negative electrode active material 242 be 0.3 to 2.0.

In the laminate battery 20 of the second embodiment, all of the first plastic film 21, the second plastic film 22, the air electrode 23, the metal negative electrode 24, the separator 25, the water-repellent film 26, and the electrolyte solution may be those conventionally used in the field of laminate batteries or metal-air batteries.

The above description provides an example of an instance in which the laminate battery 20 is a metal-air battery; however, in instances where the laminate battery 20 is an ordinary battery, the laminate battery 20 may have a configuration that uses a positive electrode in place of the air electrode 23. In this instance, the positive electrode includes a positive electrode active material layer in place of the catalyst layer 232. Furthermore, in instances where the laminate battery 20 is an ordinary battery, the air inlet opening 211 and the water-repellent film 26 are unnecessary.

Figure 5:
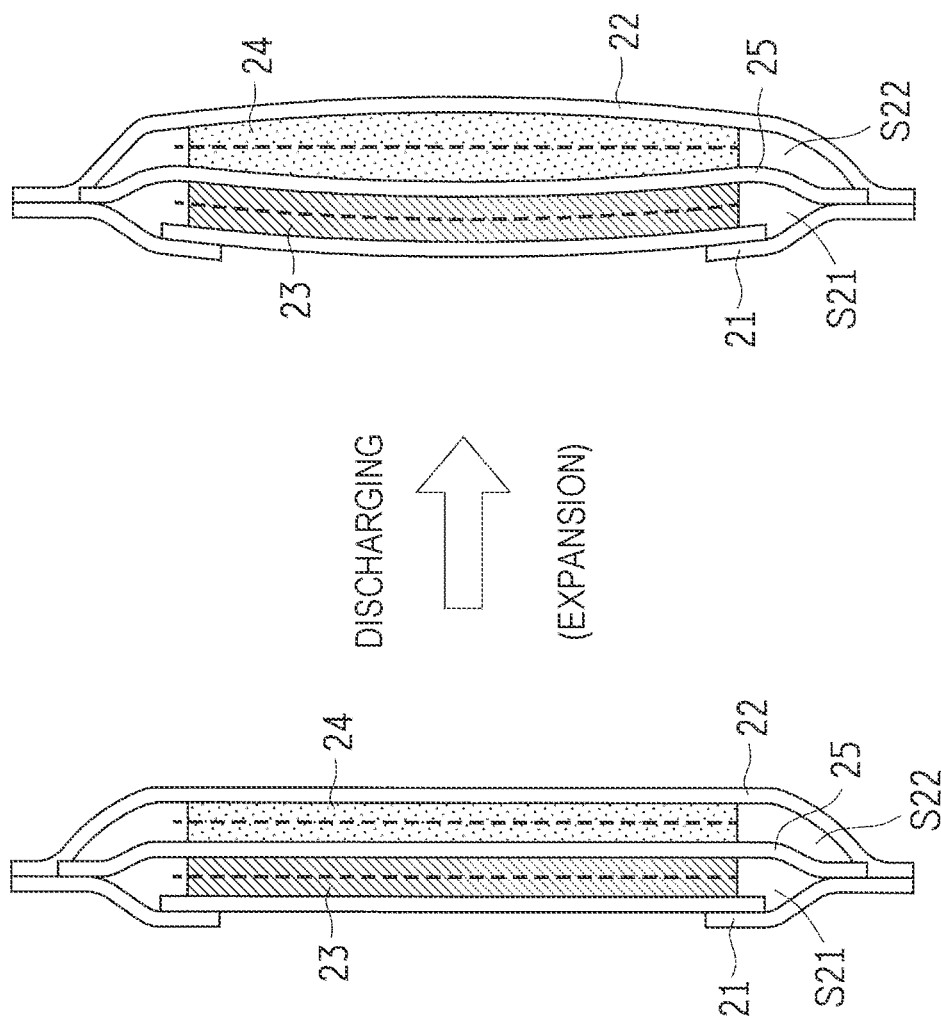
FIG. 5 is a cross-sectional view illustrating a change in a shape of the laminate battery of FIG. 4 due to discharging.

In the laminate battery 20, too, during discharging, the negative electrode active material 242 used in the metal negative electrode 24 undergoes a change in volume (expansion), which causes a change in a shape of the laminate battery 20. FIG. 5 is a cross-sectional view illustrating a change in the shape of the laminate battery 20 due to discharging.

As illustrated in FIG. 5, in instances where the metal negative electrode 24 expands as a result of discharging, the expansion causes the second storage portion S22 to deform. Note that the second storage portion S22 has a larger volume than the first storage portion S21 and also includes some space in an upper portion, and, therefore, even if the metal negative electrode 24 expands, the second storage portion S22 can be easily deformed in a manner that inhibits an increase in internal pressure. Note that even in instances where a peripheral portion of the separator 25 and a peripheral portion of the second plastic film 22 are welding to each other in the second storage portion S22, it is the welded portion of the first plastic film 21 and the second plastic film 22 that forms the outer periphery of the second storage portion S22. Accordingly, peeling of the welded portion of the separator 25 and the second plastic film 22, which may be caused by an increase in internal pressure in the second storage portion S22 due to expansion of the metal negative electrode 24, is permissible. In this instance, although the peeling of the welded portion of the separator 25 and the second plastic film 22 causes an increase in the volume of the second storage portion S22, the welded portion of the first plastic film 21 and the second plastic film 22, which are located on an outer side, does not experience peeling, and, therefore, breakage of the second storage portion S22 does not occur.

On the other hand, the first storage portion S21, which has a smaller volume, stores a positive electrode (i.e., the air electrode 23). Accordingly, even if deformation that conforms to the deformation of the second storage portion S22 occurs in the first storage portion S21, the deformation is not due to expansion within the first storage portion S21. Accordingly, internal pressure does not increase in the first storage portion S21, and, therefore, breakage does not occur, for example, at the welded portion of the first storage portion S21 (the welded portion of the separator 25 and the first plastic film 21).

As described above, the laminate battery 20 of the second embodiment has a configuration that includes the first storage portion S21 and the second storage portion S22, which have different volumes, and in which a positive electrode (i.e., the air electrode 23) is stored in the first storage portion S21, which has a smaller volume, and a negative electrode (i.e., the metal negative electrode 24) is stored in the second storage portion S22, which has a larger volume. Accordingly, breakage of the first storage portion S21 and the second storage portion S22 due to expansion of the metal negative electrode 24 is prevented, which in turn prevents the negative electrode active material 242 from flowing out from the second storage portion S22 and causing a short circuit with the air electrode 23.

Example of Method for Manufacturing Laminate Battery 20

Figure 6:
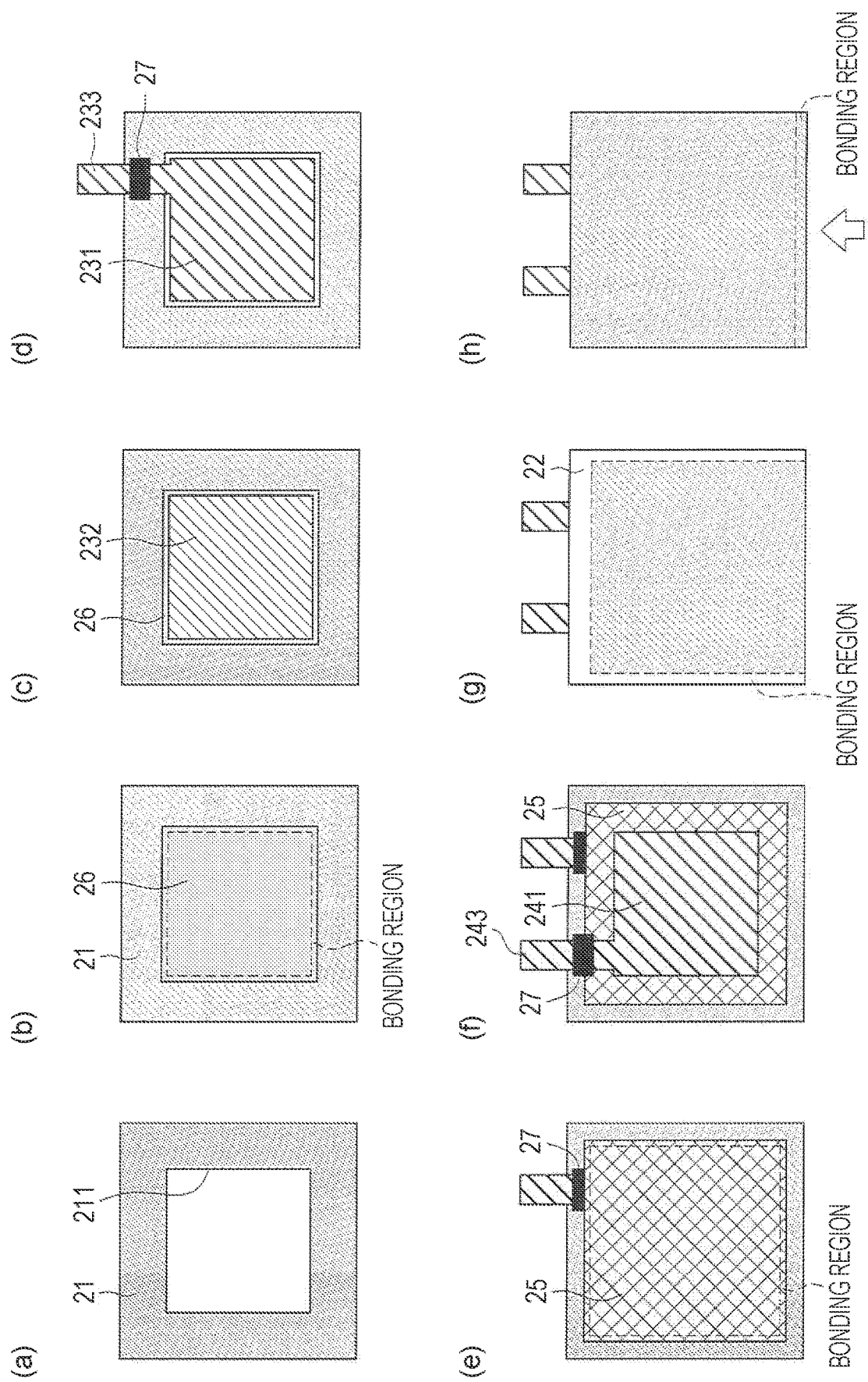
FIGS. 6(a) to 6(h) are diagrams illustrating an example of a suitable method for manufacturing the laminate battery of FIG. 4.

Now, an example of a suitable method for manufacturing the laminate battery 20 will be described with reference to FIG. 6.

First, as illustrated in FIG. 6(a), an air inlet opening 211 is formed in a first plastic film 21 (a first plastic film 21 having an air inlet opening 211 formed therein is prepared). Next, as illustrated in FIG. 6(b), a water-repellent film 26 is welding to the first plastic film 21 to cover the air inlet opening 211. In this instance, the water-repellent film 26 has an area slightly larger than that of the air inlet opening 211, and the water-repellent film 26 is placed on an edge portion of the air inlet opening 211 to be welding thereto.

Next, as illustrated in FIG. 6(c), a catalyst layer 232 of an air electrode 23 is placed on the water-repellent film 26. Furthermore, as illustrated in FIG. 6(d), a current collector 231 of the air electrode 23 is placed on the catalyst layer 232, and these are compression-bonded to one another by using a press. Note that a lead portion 233 of the current collector 231 may include, on both sides thereof, a tab film 27 attached thereto. The tab film 27 prevents leakage of the electrolyte solution from a periphery of the lead portion 233 in the laminate battery 20. A material of the tab film 27 is not particularly limited and may be a material conventionally used in the field of laminate batteries; suitably, the material may be butyl rubber. It is preferable that the tab film 27 be welding to the first plastic film 21, too. Note that the tab film 27 is not an essential component in the laminate battery 20.

Next, as illustrated in FIG. 6(e), a separator 25 is placed on the current collector 231, and the separator 25 is welding to the first plastic film 21. In this instance, the separator 25 has an area slightly larger than that of the water-repellent film 26, and the welding is performed on a portion at which the separator 25 overlaps the first plastic film 21. Note that in instances where the tab film 27 is used, the welding is performed on a portion at which the separator 25 also overlaps the tab film 27.

Next, as illustrated in FIG. 6(f), a current collector 241 of a metal negative electrode 24 is placed on the separator 25. A lead portion 243 of the current collector 241 may also include, on both sides thereof, a tab film 27 attached thereto.

Next, as illustrated in FIG. 6(g), a second plastic film 22 is placed to face the current collector 241, and welding is performed on three sides, except for a bottom side. In this instance, at the two lateral sides, thermal welding is performed on a portion at which at least the plastic films (the first plastic film 21 and the second plastic film 22) overlap each other. Furthermore, at the top side, thermal welding is performed on a portion at which at least the first plastic film 21, the second plastic film 22, and the separator 25 (and the tab film 27) overlap one another.

Lastly, as illustrated in FIG. 6(h), a zinc powder and an electrolyte solution are added through the opening at the side (bottom side) on which welding is yet to be performed, and thereafter, welding is performed on the side. In this instance, since the separator 25 is already welding to the first plastic film 21, the added zinc powder is prevented from entering the first storage portion S21 (the space between the first plastic film 21 and the separator 25). At the bottom side, thermal welding is performed on a portion at which the plastic films (the first plastic film 21 and the second plastic film 22) overlap each other. The electrolyte solution permeates through the separator 25 and reaches the air electrode.

In the manufacturing method described above, the separator 25 is welding to a plastic film that forms the enclosure member (in this case, the first plastic film 21), and, therefore, the assembling of the battery can be accomplished only with placement and welding of the components through the steps up to the step of FIG. 6(g). Accordingly, the manufacturing steps can be simplified, and, consequently, cost reduction can be achieved.

Third Embodiment

The first and second embodiments disclose configurations for instances in which the present disclosure is applied to a primary battery (or a two-electrode secondary battery). A third embodiment describes a suitable configuration for instances in which the present disclosure is applied to a three-electrode secondary battery including two positive electrodes (first positive electrode and second positive electrode) and a metal negative electrode disposed between the two positive electrodes. The following description provides an example of an instance in which the present disclosure is applied to a three-electrode metal-air secondary battery including a metal negative electrode and two positive electrodes, namely, an air electrode and a charging electrode. In addition, configurations of the present disclosure can also be applied to metal-air primary batteries including two air electrodes and a metal negative electrode disposed between the two air electrodes and to ordinary batteries that are not metal-air batteries.

Figure 7:
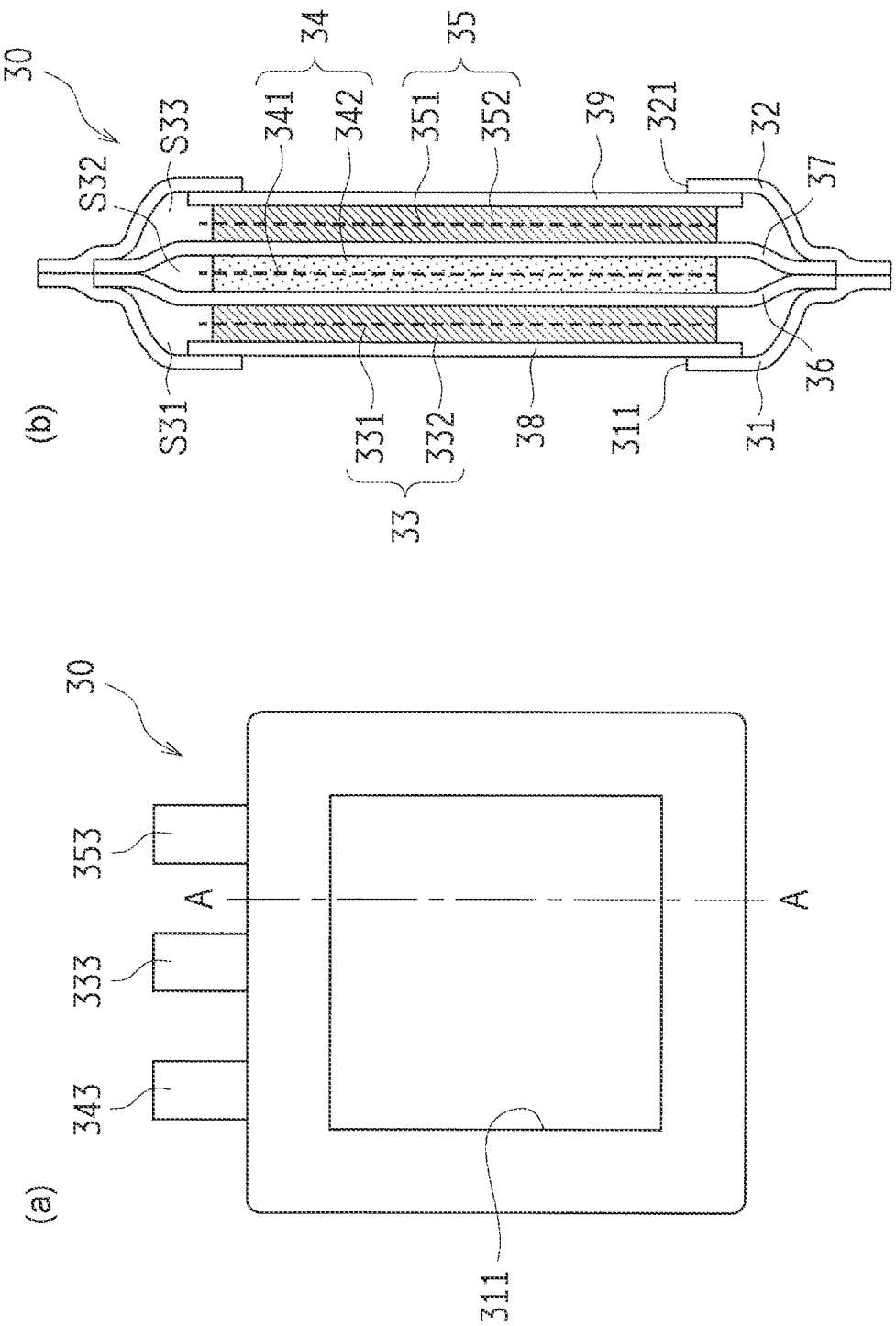
FIG. 7 is a diagram illustrating a general configuration of a laminate battery according to a third embodiment.

FIG. 7 is a diagram illustrating a general configuration of a laminate battery 30, according to the third embodiment. FIG. 7(a) is a plan view of the laminate battery 30, and FIG. 7(b) is a cross-sectional view taken along line A-A of FIG. 7(a).

As illustrated in FIG. 7, the laminate battery 30 has an enclosure member (battery case) formed of a first plastic film 31 and a second plastic film 32 that are bonded together, and the laminate battery 30 includes an air electrode (first positive electrode) 33, a metal negative electrode 34, a charging electrode (second positive electrode) 35, a first separator 36, a second separator 37, a first water-repellent film 38, and a second water-repellent film 39 within the enclosure member. Furthermore, an electrolyte solution (not illustrated) is loaded within the enclosure member.

The first separator 36 is disposed to face the first plastic film 31, and a peripheral portion of the first separator 36 is welding to a peripheral portion of the first plastic film 31. A space between the first plastic film 31 and the first separator 36 serves as a first storage portion S31, and an air electrode 33 and the first water-repellent film 38 are stored in the first storage portion S31. More specifically, the first plastic film 31 has an air inlet opening 311, which is an opening for drawing in air, and the first water-repellent film 38 is welding to the first plastic film 31 and covers the air inlet opening 311. The air electrode 33 is disposed between the first water-repellent film 38 and the first separator 36.

The second separator 37 is disposed to face the second plastic film 32, and a peripheral portion of the second separator 37 is welding to a peripheral portion of the second plastic film 32. A space between the second plastic film 32 and the second separator 37 serves as a third storage portion S33, and a charging electrode 35 and the second water-repellent film 39 are stored in the third storage portion S33. More specifically, the second plastic film 32 has an air outlet opening 321, which is an opening for discharging air, and the second water-repellent film 39 is welding to the second plastic film 32 and covers the air outlet opening 321. The charging electrode 35 is disposed between the second water-repellent film 39 and the second separator 37.

Furthermore, in a state in which the first separator 36 and the second separator 37 are disposed to face each other, a peripheral portion of the first plastic film 31 and a peripheral portion of the second plastic film 32 are welding to each other. A space between the first separator 36 and the second separator 37 serves as a second storage portion S32 as a result of the welding of the first plastic film 31 to the second plastic film 32, and the metal negative electrode 34 is stored in the second storage portion S32. Note that in the second storage portion S32, a peripheral portion of the first separator 36 and a peripheral portion of the second separator 37, with the separators facing each other, may be welding to each other. Note that even in instances where the first separator 36 and the second separator 37 are welding to each other, it is the welded portion of the first plastic film 31 and the second plastic film 32 that forms the outer periphery of the second storage portion S32.

In the laminate battery 30, an area of the first separator 36 and an area of the second separator 37 are slightly smaller than an area of the first plastic film 31 and an area of the second plastic film 32. Accordingly, the first storage portion S31, which is formed by bonding together the first separator 36 and the first plastic film 31, and the third storage portion S33, which is formed by bonding together the second separator 37 and the second plastic film 32, have a smaller volume than the second storage portion S32, which is formed by bonding together the first plastic film 31 and the second plastic film 32.

In the laminate battery 30, the first water-repellent film 38 and the second water-repellent film 39 are provided to prevent leakage of the electrolyte solution from the air inlet opening 311 and the air outlet opening 321, and have a gas-liquid separation function. The air electrode 33 is formed of a current collector 331 and a catalyst layer 332 and may have a configuration similar to that of the air electrode 23 of the second embodiment. The charging electrode 35 is formed of a current collector 351 and a catalyst layer 352. For example, the catalyst layer 352 may include a conductive porous support and a charging electrode catalyst supported on the porous support. The charging electrode catalyst is a catalyst having an oxygen generation ability (e.g., nickel) and causes the charge reaction to proceed during the charging of the laminate battery 30. The catalyst layer 352 is formed of, for example, nickel foam. Portions of the current collectors 331 and 351 are extended outside of the enclosure member and serve as lead portions 333 and 353 of the laminate battery 30. Furthermore, the nickel foam can also be used as the current collector 331. In this instance, a single piece of nickel foam serves as the current collector 331 and the catalyst layer 332.

It is preferable that the charging electrode 35 have a thickness of 0.2 mm to 2 mm.

The metal negative electrode 34 is formed of a current collector 341 and a negative electrode active material 342. More specifically, the metal negative electrode 34 is formed by separately loading the current collector 341 and metal particles of the negative electrode active material 342 (e.g., zinc) into the second storage portion S32 of the laminate battery 30. A portion of the current collector 341 is extended outside of the enclosure member and serves as a lead portion 343 of the laminate battery 30.

In the laminate battery 30 of the third embodiment, all of the first plastic film 31, the second plastic film 32, the air electrode 33, the metal negative electrode 34, the charging electrode 35, the first separator 36, the second separator 37, the first water-repellent film 38, the second water-repellent film 39, and the electrolyte solution may be those conventionally used in the field of laminate batteries or metal-air batteries.

The above description provides an example of an instance in which the laminate battery 30 is a metal-air secondary battery; however, in instances where the laminate battery 30 is an ordinary secondary battery, the laminate battery 30 may have a configuration that uses a first positive electrode for discharging, in place of the air electrode 33, and uses a second positive electrode for charging, in place of the charging electrode 35. In this instance, the first positive electrode and the second positive electrode include positive electrode active material layers in place of the catalyst layers 332 and 352. Furthermore, in instances where the laminate battery 30 is an ordinary secondary battery, the air inlet opening 311, the air outlet opening 321, the first water-repellent film 38, and the second water-repellent film 39 are unnecessary.

Furthermore, the above description provides an example of an instance in which the laminate battery 30 is a metal-air secondary battery; however, in instances where the laminate battery 30 is a metal-air primary battery, the laminate battery 30 may have a configuration that uses an air electrode 33 in place of the charging electrode 35. In this instance, the respective air electrodes 33 are disposed on the front and back sides of the metal negative electrode 34.

Figure 8:
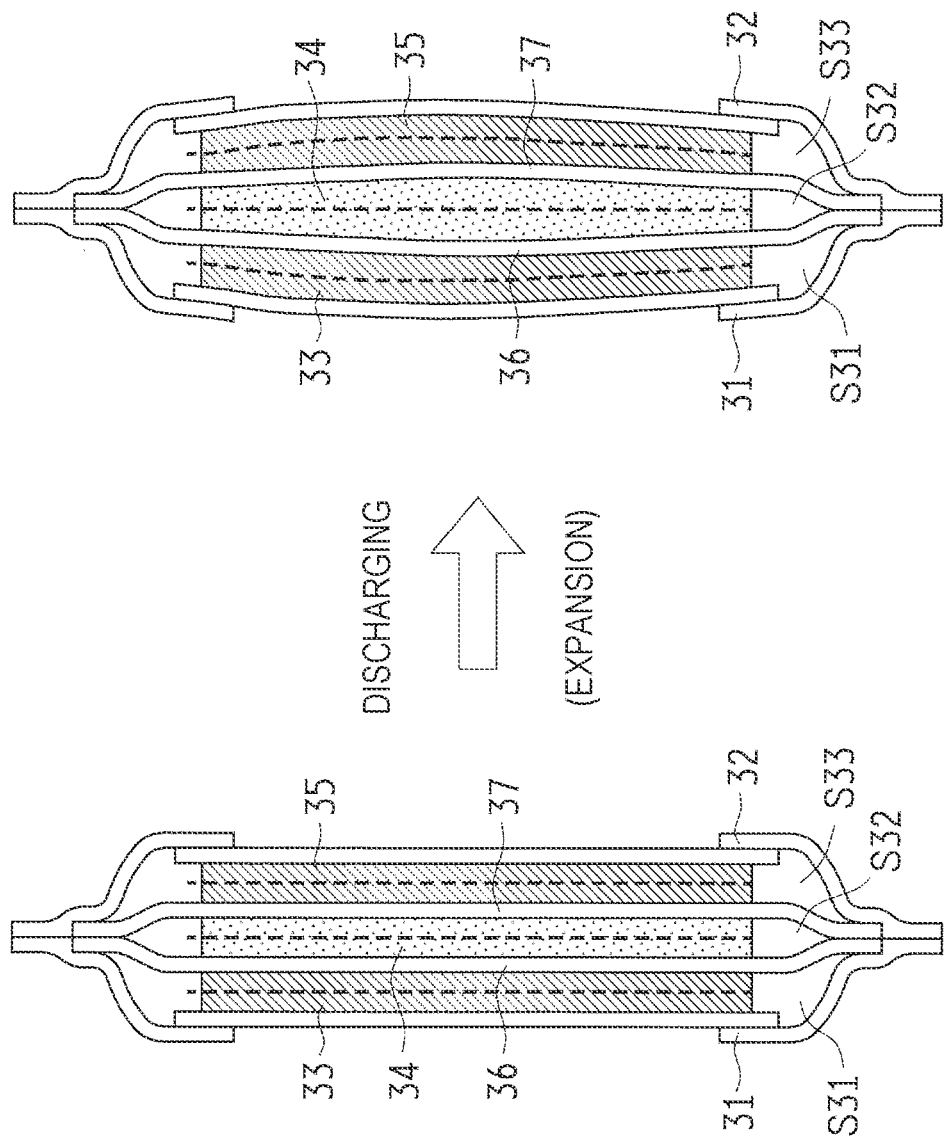
FIG. 8 is a cross-sectional view illustrating a change in a shape of the laminate battery of FIG. 7 due to discharging.

In the laminate battery 30, too, during discharging, the negative electrode active material used in the metal negative electrode 34 undergoes a change in volume (expansion), which causes a change in a shape of the laminate battery 30. FIG. 8 is a cross-sectional view illustrating a change in the shape of the laminate battery 30 due to discharging.

As illustrated in FIG. 8, in instances where the metal negative electrode 34 expands as a result of discharging, the expansion causes the second storage portion S32 to deform. Note that the second storage portion S32 has a larger volume than the first storage portion S31 and the third storage portion S33 and also includes some space in an upper portion, and, therefore, even if the negative electrode 34 expands, the second storage portion S32 can be easily deformed in a manner that inhibits an increase in internal pressure. Note that even in instances where a peripheral portion of the first separator 36 and a peripheral portion of the second separator 37 are welding to each other in the second storage portion S32, it is the welded portion of the first plastic film 31 and the second plastic film 32 that forms the outer periphery of the second storage portion S32. Accordingly, peeling of the welded portion of the first separator 36 and the second separator 37, which may be caused by an increase in internal pressure in the second storage portion S32 due to expansion of the metal negative electrode 34, is permissible. In this instance, although the peeling of the welded portion of the first separator 36 and the second separator 37 causes an increase in the volume of the second storage portion S32, the welded portion of the first plastic film 31 and the second plastic film 32, which are located on an outer side, does not experience peeling, and, therefore, breakage of the second storage portion S32 does not occur.

On the other hand, the first storage portion S31 and the third storage portion S33, which have a smaller volume, store positive electrodes (i.e., the air electrode 33 and the charging electrode 35). Accordingly, even if deformation that conforms to the deformation of the second storage portion S32 occurs in the first storage portion S31 and the third storage portion S33, the deformation is not due to expansion within the first storage portion S31 and the third storage portion S33. Accordingly, internal pressure is not exerted in the first storage portion S31 or the third storage portion S33, and, therefore, breakage does not occur, for example, at the welded portions of the first storage portion S31 and the third storage portion S33 (the welded portion of the first separator 36 and the first plastic film 31 and the welded portion of the second separator 37 and the second plastic film 32).

As described above, the laminate battery 30 of the third embodiment has a configuration that includes the first storage portion S31 and the third storage portion S33, and the second storage portion S32, which have different volumes, with the first storage portion S31 and the third storage portion S33, which have a smaller volume, serving as positive electrode storage portions, and the second storage portion S32, which has a larger volume, serving as a negative electrode storage portion. Accordingly, breakage of the first to third storage portions S31 to S33 due to expansion of the metal negative electrode 34 is prevented, which in turn prevents the negative electrode active material 342 from flowing out from the second storage portion S32 and causing a short circuit with the air electrode 33 or the charging electrode 35.

Example of Method for Manufacturing Laminate Battery 30

Figure 9:
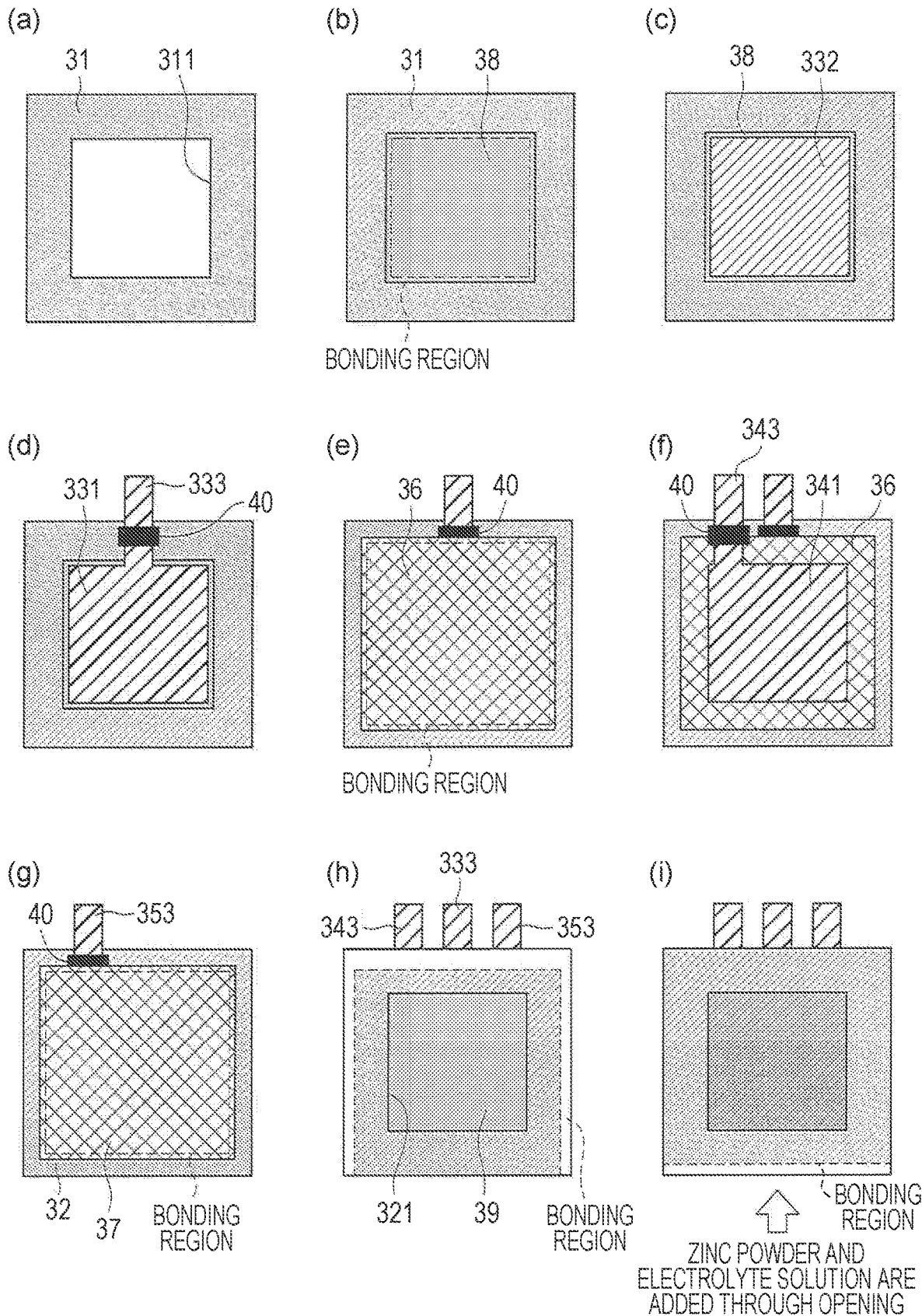
FIGS. 9(a) to 9(i) are diagrams illustrating an example of a suitable method for manufacturing the laminate battery of FIG. 7.

Now, an example of a suitable method for manufacturing the laminate battery 30 will be described with reference to FIG. 9.

First, as illustrated in FIG. 9(a), an air inlet opening 311 is formed in a first plastic film 31 (a first plastic film 31 having an air inlet opening 311 formed therein is prepared). Next, as illustrated in FIG. 9(b), a first water-repellent film 38 is welding to the first plastic film 31 to cover the air inlet opening 311. In this instance, the first water-repellent film 38 has an area slightly larger than that of the air inlet opening 311, and the first water-repellent film 38 is placed on an edge portion of the air inlet opening 311 to be welding thereto.

Next, as illustrated in FIG. 9(c), a catalyst layer 332 of an air electrode 33 is placed on the first water-repellent film 38. Furthermore, as illustrated in FIG. 9(d), a current collector 331 of the air electrode 33 is placed on the catalyst layer 332, and these are compression-bonded to one another by using a press. Note that a lead portion 333 of the current collector 331 may include, on both sides thereof, a tab film 40 attached thereto.

Next, as illustrated in FIG. 9(e), a first separator 36 is placed on the current collector 331, and the first separator 36 is welding to the first plastic film 31. In this instance, the first separator 36 has an area slightly larger than that of the first water-repellent film 38, and the welding is performed on a portion at which the first separator 36 overlaps the first plastic film 31. Note that in instances where the tab film 40 is used, the welding is performed on a portion at which the first separator 36 also overlaps the tab film 40.

Next, as illustrated in FIG. 9(f), a current collector 341 of a metal negative electrode 34 is placed on the first separator 36. A lead portion 343 of the current collector 341 may also include, on both sides thereof, a tab film 40 attached thereto.

Furthermore, by using the same procedure as that described for FIGS. 9(a) to 9(e), a laminate is prepared in which a second plastic film 32, a second water-repellent film 39, a charging electrode 35 (a catalyst layer 352 and a current collector 351), and a second separator 37 are placed and welding (see FIG. 9(g)). Note that the lead portion 353 of the charging electrode 35 is to be located at a shifted position such that the lead portion 353 does not overlap the lead portions 333 and 343 of the air electrode 33 and the metal negative electrode 34.

The laminate obtained in the step of FIG. 9(f) and the laminate obtained in the step of FIG. 9(g) are placed on top of each other such that the first separator 36 and the second separator 37 face each other, with the current collector 341 of the metal negative electrode 34 disposed therebetween, and welding is performed on three sides, except for a bottom side (see FIG. 9(h)). In this instance, at the two lateral sides, thermal welding is performed on a portion at which at least the plastic films (the first plastic film 31 and the second plastic film 32) overlap each other. Furthermore, at the top side, thermal welding is performed on a portion at which at least the first plastic film 31, the second plastic film 32, the first separator 36, and the second separator 37 (and the tab film 40) overlap one another.

Lastly, as illustrated in FIG. 9(i), a zinc powder and an electrolyte solution are added through the opening at the side (bottom side) on which welding is yet to be performed, and thereafter, welding is performed on the side. In this instance, since the first separator 36 is already welding to the first plastic film 31, and the second separator 37 is already welding to the second plastic film 32, the added zinc powder is prevented from entering the first storage portion S31 and the third storage portion S33. At the bottom side, thermal welding is performed on a portion at which the plastic films (the first plastic film 31 and the second plastic film 32) overlap each other.

In the manufacturing method described above, the separators that form the second storage portion (the first separator 36 and the second separator 37) are welding to the plastic films that form the enclosure member (the first plastic film 31 and the second plastic film 32), and, therefore, the assembling of the battery can be accomplished only with placement and welding of the components through the steps up to the step of FIG. 9(h). That is, there is no need for the steps of processing two separators to form a bag shape, storing a negative electrode in a bag-shaped separator, and storing the bag-shaped separator in an enclosure member. Accordingly, the manufacturing steps can be simplified, and, consequently, cost reduction can be achieved.

The embodiments disclosed herein are illustrative in all respects and are not intended to be a basis for limiting interpretation. Accordingly, the technical scope of the present disclosure is not to be construed as being limited to the embodiments set forth above but is defined based on the claims. Furthermore, the technical scope of the present disclosure encompasses all changes within the meaning and range equivalent to those of the claims.

The invention claimed is:

1. A laminate battery comprising a positive electrode, a negative electrode, and a separator that are laminated in place within an enclosure member, wherein
    the enclosure member is formed of a first plastic film and a second plastic film that are bonded together,
    the positive electrode includes a first positive electrode and a second positive electrode, the first positive electrode is disposed to face the first plastic film, and the second positive electrode is disposed to face the second plastic film,
    the separator includes a first separator and a second separator that are disposed between the first plastic film and the second plastic film, a peripheral portion of the first separator is welded to the first plastic film, and a peripheral portion of the second separator is welded to the second plastic film,
    a space between the first separator and the first plastic film serves as a first positive electrode storage portion that stores the first positive electrode, and an outer periphery of the first positive electrode storage portion is formed by a welded portion of the first separator and the first plastic film,
    a space between the second separator and the second plastic film serves as a second positive electrode storage portion that stores the second positive electrode, and an outer periphery of the second positive electrode storage portion is formed by a welded portion of the second separator and the second plastic film, a space between the first separator and the second separator serves as a negative electrode storage portion that stores the negative electrode, and an outer periphery of the negative electrode storage portion is formed by a welded portion of the first plastic film and the second plastic film, the negative electrode includes a particulate negative electrode active material, and the first separator and the second separator are not welded to each other.

2. The laminate battery according to claim 1, wherein the negative electrode further includes a first current collector in contact with a portion of the particulate negative electrode active material, and the first current collector is electrically connected to a first lead portion exposed outside of the enclosure member.

3. The laminate battery according to claim 1, wherein the first positive electrode is an air electrode that includes a catalyst having an oxygen reduction ability, the second positive electrode is a charging electrode that includes a catalyst having an oxygen generation ability, the enclosure member has an air inlet opening on a side that faces the first positive electrode and has an air outlet opening on a side that faces the second positive electrode, and a water-repellent film is disposed between the first positive electrode and the air inlet opening, and another water-repellent film is disposed between the second positive electrode and the air outlet opening.

4. The laminate battery according to claim 1, wherein the negative electrode is a slurry in which the particulate negative electrode active material is dispersed in an electrolyte solution.

5. The laminate battery according to claim 1, wherein the positive electrode further includes an air electrode including a catalyst layer, the enclosure member has an air inlet opening on a side that faces the positive electrode, and a water-repellent film is disposed between the positive electrode and the air inlet opening.

6. The laminate battery according to claim 1, wherein a volume of the first positive electrode storage portion and the second positive electrode storage portion is less than a volume of the negative electrode storage portion.

7. The laminate battery according to claim 1, wherein a volume of the first positive electrode storage portion and the second positive electrode storage portion is 0.05 to 0.25 times a volume of the negative electrode storage portion.

8. The laminate battery according to claim 1, wherein a ratio of an area of the separator to an area of the first plastic film is 0.55 to 0.95.

* * * * *